United States Patent Office.

JOHN ROWLEY, OF NO. 77 WELLS STREET, CAMBERWELL, ASSIGNOR TO "THE INDIA DYE COMPANY" (LIMITED,) OF LONDON, ENGLAND.

Letters Patent No. 101,048, dated March 22, 1870; patented in England, July 22, 1869.

IMPROVEMENT IN TREATING COAL PRODUCTS TO OBTAIN BENZOLE, &c.

The Schedule referred to in these Letters Patent and making part of the same.

To all whom it may concern:

Be it known that I, JOHN ROWLEY, of No. 77 Wells street, Camberwell, county of Surrey, England, have invented "An Improvement in the Manufacture of Coal-Tar Products;" and I do hereby declare that the following is a full and exact description thereof.

By the method of obtaining naphtha containing benzole by the distillation of gas-tar, hitherto in ordinary use, there are other products obtained, which are known as creosote and naphthaline, and which hitherto have not been available for the production of benzole; and The object of my invention is to use and treat these bodies in the manner hereinafter described, so as to produce benzole or other homologous products.

I take creosote or naphthaline, and well saturate the creosote or naphthaline with chlorine gas. This I then distil, and, after getting away the oil, a fatty matter comes over, which I employ as hereinafter described.

I take the naphtha obtained by the distillation of gas-tar and treat it with sulphuric acid, employing from thirty to forty per cent., by weight, of acid with the naphtha. I well agitate the mixture for about two or three days, for the purpose of getting away any tar and pitch. I then put in the requisite quantity of soda to neutralize the acid, and let it settle, whereby the naphtha becomes more purified. I then draw off the naphtha and put it in a still, to which I add from ten to twenty-five per cent. of the fatty matter obtained from the creosote or naphthaline, as above mentioned. I then distil in the usual way, and so I obtain benzole or other homologous products, from which aniline dyes can be made.

I do not confine myself to obtain the fatty matter by distillation, as it can be obtained by pressing or filtration. I, however, prefer distillation.

Having now described my invention, I wish it to be understood that

What I claim as my invention, and desire to secure by Letters Patent, is—

The manufacture of benzole or other homologous products from creosote or naphthaline, in the manner substantially set forth herein.

JOHN ROWLEY.

Witnesses:
J. H. RICHARDSON, } 11 Poultry, City of
THOMAS ELSON. } London, England.